United States Patent [19]

Olson

[11] Patent Number: 4,616,054

[45] Date of Patent: Oct. 7, 1986

[54] REDUCTION OF VOLATILE ORGANIC EMISSIONS FROM POLYESTER COMPOSITIONS

[75] Inventor: Morris R. Olson, Minnetonka, Minn.

[73] Assignee: Cargill Incorporated, Minneapolis, Minn.

[21] Appl. No.: 683,182

[22] Filed: Dec. 18, 1984

Related U.S. Application Data

[63] Continuation-in-part of Ser. No. 518,371, Jul. 29, 1983, abandoned, which is a continuation of Ser. No. 339,515, Jan. 15, 1982, abandoned.

[51] Int. Cl.$^4$ ............................................... C08L 67/02
[52] U.S. Cl. .................................... 524/317; 524/376; 524/389; 524/539; 524/598; 524/601; 525/443
[58] Field of Search ............... 524/389, 539, 598, 317, 524/376, 601; 525/443

[56] References Cited

U.S. PATENT DOCUMENTS

| | | | |
|---|---|---|---|
| T991,002 | 3/1980 | Leonard | 260/15 |
| 2,819,237 | 1/1958 | Daniel, Jr. | 524/501 |
| 3,245,932 | 4/1966 | Glavis | 524/376 |
| 3,311,583 | 3/1967 | Bearden | 524/389 |
| 3,403,088 | 9/1968 | Hart | 204/181 R |
| 3,803,483 | 5/1975 | Anderson et al. | 528/45 |
| 3,821,145 | 6/1974 | Walus | 524/504 |
| 4,294,738 | 10/1981 | Beresniewicz | 524/165 |
| 4,313,861 | 2/1982 | Bassett et al. | 260/29.6 H |
| 4,314,044 | 2/1982 | Hughes et al. | 260/29.6 M |
| 4,315,910 | 2/1982 | Nowak, Jr. et al. | 424/47 |

FOREIGN PATENT DOCUMENTS

| | | |
|---|---|---|
| 0004053 | 9/1979 | European Pat. Off. . |
| 0062866 | 10/1982 | European Pat. Off. . |
| 0083016 | 7/1983 | European Pat. Off. . |
| 1378480 | 12/1974 | United Kingdom . |
| 1471779 | 4/1977 | United Kingdom . |
| 1475348 | 6/1977 | United Kingdom . |
| 1515558 | 6/1978 | United Kingdom . |
| 1556109 | 11/1979 | United Kingdom . |
| 1590609 | 6/1981 | United Kingdom . |
| 1603149 | 11/1981 | United Kingdom . |

OTHER PUBLICATIONS

Product bulletin of the Dow Chemical Company relating to "Hydroxyethyl Acrylate and Hydroxypropyl Acrylate, 1976, pp. 1–31.

*Primary Examiner*—Theodore E. Pertilla
*Attorney, Agent, or Firm*—Fitch, Even, Tabin & Flannery

[57] ABSTRACT

The invention describes a composition and method for the reduction of volatile organic emissions from polyester compositions having a hydroxyl value of at least 150 using water and an organic solvent.

35 Claims, No Drawings

REDUCTION OF VOLATILE ORGANIC EMISSIONS FROM POLYESTER COMPOSITIONS

This application is a continuation-in-part of U.S. application Ser. No. 518,371, filed July 29, 1983, now abandoned, which is a continuation of U.S. application Ser. No. 339,515, filed Jan. 15, 1982, now abandoned.

This invention relates to the reduction of volatile organic emissions from polyester compositions. More particularly, this invention relates to water as a solvent in high solid polyester coating compositions to reduce organic emissions.

Environmental concern has become increasingly important in recent years. This concern not only extends to preservation of the environment for its own sake, but extends to safety for the public as to both living and working conditions. Volatile organic emissions resulting from coating compositions which are applied and used by industry and by the consuming public are often not only unpleasant, but contribute to photochemical smog. Governments may or have established regulations setting forth guidelines relating to volatile organic compounds (VOCs) which may be released to the atmosphere. The U.S. Environmental Protection Agency (EPA) has established guidelines relating to the amount of VOCs released to the atmosphere, such guidelines being scheduled for adoption by the states of the United States. Guidelines relating to VOCs, such as those of the EPA, and environmental concerns are particularly pertinent to the paint and industrial coating industry which uses organic solvents which are emitted into the atmosphere.

With respect to coating compounds, and in response to environmental concern, organic resins which are high in solids content have been developed and are known to reduce organic emissions with the use of resinous coatings. The higher the solid content, the less solvent available to emit into the atmosphere. Higher solid content is almost always a goal, but generally some solvent is required to apply coating resins. In particular, where the viscosity of the resinous binder system alone is greater than about 500 poise, a reduction in viscosity is necessary if the coating is to be applied by common means, such as brush, roller or spray. It is an object of this invention to provide a solvent system which is compatible with a baking high solid polyester coating composition which will provide reduced organic emissions into the atmosphere.

The present invention is concerned with coating systems in which the high solids resin or binder system is not by itself compatible with water. If the resin system naturally has a very low viscosity the resinous binder system may generally be applied without a viscosity-reducing solvent. There is little added benefit afforded by water-solubility of such binder systems when little or no solvent is required for viscosity reduction. U.K. Pat. No. 1,471,779 is an example of a resinous binder system having very low viscosity resin systems, e.g., lower than about 500 poise, which except in special circumstances require no organic solvent or water for application to surfaces. In U.K. Pat. No. 1,471,779 a low molecular weight binder is used with water only if it is compatible with water, whereas the present invention is concerned primarily with reducing VOCs from coating systems which require some organic solvents which by themselves are not compatible with water.

U.K. Pat. No. 1,556,109 is an example of an binder system that is etherified to make it more compatible with water. Long previously known, U.K. Pat. No. 1,556,109 incorporates polyethylene glycol or other ether linkages in its binder system to formulate water-dilutable curable paint coatings. This concept has long been known.

It has been discovered that water in conjunction with an organic solvent or solvent mixture, which is soluble in water at 25° C. in the range from about 5% by weight to complete miscibility in water; a non-etherified polyester having a hydroxyl value of 150 or greater; and one or more cross linking agents which are miscible with such polyester/solvent/water combination reduces the emission of volatile organic compounds from that which would be experienced with the use of organic solvents without water as a cosolvent.

Surprisingly, high solids polyesters having hydroxyl values of 150 or greater have been discovered to have an affinity for water. The amount of water which can be added to a polyester baking system increases with increasing hydroxyl value and decreasing molecular weight. Hence, in the invention the amount of water used is a function of the hydroxyl value of the polyester in the coating composition. High solids polyesters with a hydroxyl value of 150 or greater may be prepared from the reaction of a dibasic acid and an organic polyol having at least two hydroxyl groups. The resulting high solids polyesters may be mixed with an organic solvent which has a water solubility in the range from about 5% by weight to complete miscibility in water, water, and an amino resin cross linking agent to form a coating composition with reduced volatile organic emissions. To be effective in reducing VOCs, water must comprise at least about 2% by weight of the coating system, and the cosolvent, including the water and organic solvent, may comprise up to about 30% by weight of the coating composition with the preferred range of the ratio of water to organic solvent being from about 20/80 to about 60/40. In the coating composition of the present invention, the cosolvent (water plus organic solvent) is generally required at at least about 20% by wt. of the composition to facilitate application of the composition to a surface. Cellosolve acetate, normal butanol, isobutanol, n-propoxypropanol and butyl cellosolve are representative solvents which may be used in the coating composition with butyl cellosolve a preferred solvent. Methylated melamine, methylated urea, and hexamethoxymethyl melamine are representative amino resin cross linking agents with hexamethoxymethyl melamine, commercially available as Cymel 303 from American Cyanamid Co., or Resimene 747 from Monsanto Polymer Products Co., and being a preferred cross linking agent. The invention is not appropriate with cross linking agents such as urethanes which react with water.

Hence, this invention is to be distinguished from those binders which incorporate significant proportions of moieties having multiple ether linkages, such as polyethylene glycol. Such binders are known to acquire water solubility through the inherent water solubility of the moiety with the multiple ether bonds as described in U.K. Patent Specification No. 1,556,109.

The polyester/solvent/water compositions of the invention are blended by mechanically mixing the ingredients. Preferably, as it is made, the polyester will have sufficient organic solvent to reduce its viscosity to Z6 or less. Preferably, the cross linking agent such as Cymel 303 or Resimeme 747 then is added to such polyester organic solvent mixture. Preferably, thereafter, the remaining desired organic solvent is added and then the desired water is added. The addition of too much water before the addition of sufficient organic solvent may result in poor mixing. Preferably all of the afore-described mixing is done between room temperature to about 50° C.

High Solids Polyesters

The preferred polyesters for use with the water and organic cosolvent combination have hydroxyl values of at least about 150 to about 350 and number average molecular weights in the range from about 300 to about 1100. Generally, they are made from the reaction of dibasic acids or acid anhydrides such as isophthalic acid, adipic acid, phthalic anhydride and terephthalic acid with polyols, such as propylene glycol, neopentyl glycol, and trimethylol propane. The polyesters in accordance with the invention do not incorporate moieties, such as polyethylene glycol moieties, which have multiple ether linkages because the addition of such moieties would substantially increase the molecular weight. Optionally, a solvent of the type specified in this invention may be added during or immediately after production of the resin for ease in handling the resin. Further pigments may be optionally added to the polyester resin. These pigments include metallic oxides, such as titanium dioxide and iron oxide, metallic flakes, such as bronze or nickel flakes, metallic powders, phthalocyanine pigments, monastral pigments, molybdate pigments, such as molybdate organge, quinacridone pigments, sulfate pigments, carbonate pigments, carbon black pigments, silica pigments, and other organic and inorganic pigments known in the art. The pigment to binder weight ratio is usually in the ratio from about 0 (for clear coatings) to about 2 to 1. The solids content of the resulting polyester resin normally is in the range from about 85% to about 100% by weight.

The following examples of polyesters are provided to illustrate polyesters which can be used in the invention; however, they should not be construed as limiting the scope of the invention.

EXAMPLE I 41.00 grams of propylene glycol, 29.82 grams of phthalic anhydride, and 29.40 grams of adipic acid are charged into a reactor and are heated under an inert gas to about 460° F. for about 2 hours. After the 2 hours, the reaction is cooled to 250° F. and 10.00 grams of cellosolve acetate is added. The resulting mixture is cooled and yields a polyester having about 90% solids by weight, a hydroxyl value of about 160, a viscosity in the range of about Z3 to about Z5 and a weight per gallon of about 9.8 pounds.

EXAMPLE II 44.90 grams of neopentyl glycol (90% in water), 5.77 grams of trimethylol propane, 23.39 grams of adipic acid, and 26.58 grams of isophthalic acid are charged into a reactor and are slowly heated to 460° F. under an inert gas until an acid value of about not more than 10 is reached. The reaction mixture is cooled to 250° F., whereupon, 15.00 grams of cellosolve acetate is added to the reaction mixture. The resulting mixture is a polyester having a number average molecular weight of about 750, about 85% solids by weight, a hydroxyl value of about 175, a viscosity of about Z4 to about Z6, and a weight per gallon of about 9.3 pounds.

EXAMPLE III 47.06 grams of propylene glycol, 28.96 grams of adipic acid, 32.96 grams of isophthalic acid, and 0.05 grams of Fascat 4100 which is hydrated monobutyltin oxide and a product of M&T Chemical Co. are slowly heated to 380° F. and then to 420° F. until the resin clears and an acid number of about 9 (90% in cellosolve acetate) is reached. The reaction mixture is cooled to 275° F. and 5 grams of cellosolve acetate is added. The resulting mixture is a polyester having a number average molecular weight of about 450, about 90% solids by weight, a hydroxyl value of about 240 to about 250, a viscosity of about Z5 to about Z6, and a weight per gallon of about 9.8 pounds.

EXAMPLE IV

A high solids baking alkyd for use in the invention may be prepared by charging 400 grams of soya acids, 193 grams of trimethylol propane, 20 grams of xylol, 6 grams of triphenyl phosphate, and 490 grams of propylene glycol into a reactor and heating the reactants to about 200° F. 748 grams of isophthalic acid, and 100 grams of terephthalic acid then are added to the reaction mixture which is slowly heated to 450° F. for about 15 hours when the mixture clears and an acid value of about 9 to 10 is reached. The mixture then is cooled to about 240° F. and 325 grams of butyl cellosolve is added to the resulting alkyd resin. The resin has a number average molecular weight of about 750, a weight per gallon of about 8.95 pounds, a hydroxyl value of about 150, and a viscosity of about Z2 (85% in cellosolve acetate). A suitable alkyd may also be obtained by substituting tall oil acids for the soya acids in the above formulation.

Finally, polyesters which are suitable for use in the invention may be obtained by mixing the reactants in the ratios shown in Table I according to the general procedure of Example I, except that the cooks may be done at about 400° F. to about 420° F. and Fascat is used in all cooks.

TABLE I

| | Suitable Polyesters for Use in the Invention | | | | | | | | | |
|---|---|---|---|---|---|---|---|---|---|---|
| Resin | Moles Propylene Glycol | Moles Neopentyl Glycol | Moles Trimethylol Propane | Moles Isophthalic Acid | Moles Phthalic Anhydride | Moles Adipic Acid | Moles Polyethylene Terephthalate | OH Value | Acid Value | Viscosity |
| 1 | 3.0 | | 0.3 | | 1.0 | 1.0 | | 329 | 9.4 | Z3-Z4 |
| 2 | 3.3 | | | 1.0 | | 1.0 | | 310 | 9.2 | Z5 |
| 3 | | 2.7 | 0.3 | | 1.0 | 1.0 | | 238 | 8.2 | Z4-Z5 |
| 4 | | 2.85 | 0.15 | 1.0 | | 1.0 | | 224 | 7.5 | Z4 |
| 5 | | 3.0 | | 1.0 | | 1.0 | | 211 | 7.9 | Z4 |
| 6 | | 3.3 | | 1.0 | | 1.0 | | 262 | 9.6 | Z5 |
| 7 | | 3.3 | | | 1.0 | 1.0 | | 262 | 8.6 | Z5 |
| 8 | | 2.85 | 0.15 | 1.0 | | 1.0 | | 224 | 7.3 | Z3 |

TABLE I-continued

Suitable Polyesters for Use in the Invention

| Resin | Moles Propylene Glycol | Moles Neopentyl Glycol | Moles Trimethylol Propane | Moles Isophthalic Acid | Moles Phthalic Anhydride | Moles Adipic Acid | Moles Polyethylene Terephthalate | OH Value | Acid Value | Viscosity |
|---|---|---|---|---|---|---|---|---|---|---|
| 9 | 2.1 | | | 0.1 | | 1.0 | 0.9 | 243 | 7.9 | Z3 |

Cosolvent Polyester Amino Resin Formulations

According to the invention, the previously described high solids polyesters may be combined with up to about 30% by weight of an organic solvent or solvent mixture which has a water solubility in the range from about 5% by weight to complete miscibility in water; at least 2% by weight water based upon the weight of the coating composition; and one or more cross linking resins which are miscible with such polyester/solvent/water combination. The latter combination forms a coating composition which will reduce the emission of conventional volatile organic compounds as opposed to using a composition with a neat organic solvent. The preferred cross linker resins are amino resins such as methylated melamine, methylated urea, or hexamethyoxymethyl melamine which form from about 20 to about 35 percent by weight of the coating compositions.

Table II illustrates various formulations which result in the reduction of VOCs by using water as a solvent in the coating composition. Table II also includes the amount of solids (NV), and the amount of volatile organic compounds per 1000 grams of coating composition for systems using cellosolve acetate (CA) as solvent, butyl cellosolve (BC) as solvent, and a butyl cellosolve-water solvent. In each case the polyester or alkyd resin was combined with hexamethyoxymethyl melamine commercially known as Cymel 303 (Cy 303) or Resimene 747.

TABLE II

Reduction of VOCs Using Water Cosolvent

| RESIN | OH Value | Resin/Res 747 or Cy 303 | % VOC Solvent | % Water | % NV | VOC Gms. 1000 Film | H2O—BC vs CA % VOC reduced (%) |
|---|---|---|---|---|---|---|---|
| Example II | 175 | 75/25 | 28-CA | — | 72 | 480 | |
| Example II | 175 | 75/25 | 30-BC | — | 70 | (524) | |
| Example II | 175 | 75/25 | 24.0-BC | 8.0 | 68 | 440 | 8.3% |
| Resin 4, Table I | 220 | 73/27 | 25-CA | — | 75 | 430 | |
| Resin 4, Table I | 220 | 73/27 | 27-BC | — | 73 | (468) | |
| Resin 4, Table I | 220 | 73/27 | 19.3-BC | 9.9 | 70.8 | 373 | 13.2% |
| Example III | 245 | 70/30 | 23-CA | — | 77 | 404 | |
| Example III | 245 | 70/30 | 25-BC | — | 75 | (440) | |
| Example III | 245 | 70/30 | 12.0-BC | 12.0 | 75.7 | 250 | 38.1% |
| Resin 6, Table I | 260 | 73/27 | 22-CA | — | 78 | 375 | |
| Resin 6, Table I | 260 | 73/27 | 24-BC | — | 76 | (410) | * |
| Resin 6, Table I | 260 | 73/27 | 3-CA, 14-BC | 10.0 | 73 | 322 | 14.1% |
| Resin 1, Table I | 320 | 70/30 | 20-CA | — | 80 | 351 | |
| Resin 1, Table I | 320 | 70/30 | 22-BC | — | 78 | (387) | * |
| Resin 1, Table I | 320 | 70/30 | 2.7-CA, 7.6BC | 13.7 | 76 | 228 | 35.0% |
| Example IV | 150 | 75/25 | 30-CA | — | 70 | 524 | |
| Example IV | 150 | 75/25 | 31.5-BC | — | 68.5 | (557) | |
| Example IV | 150 | 75/25 | 25.8-BC | 6.7 | 67.5 | 475 | 9.3% |
| Resin 6, Table I | 260 | 73/27 | 13.7-BC | 9.2 | 77 | 263 | 29.9% |
| Resin 1, Table I | 320 | 70/30 | 8.3-BC | 11.5 | 80 | 193 | 45.0% |

*Can be increased with all BC
( ) BC systems listed in parentheses because they were not used in the "VOC reduced %" calculation.

Table III shows formulations of various high solids polyesters and alkyds with Cymel 303 or Resimene 747 and different organic solvent water combinations.

TABLE III

Polyester/Resimene 747 or Cymel 303/Solvent Systems

| Resin | OH Value | Resin/Cy 303 or Res 747 | % VOC Solvent | % Water | % NV | VOC gms/1000 Film |
|---|---|---|---|---|---|---|
| Example III | 245 | 70/30 | 23-CA | — | 77 | 404 |
| Example III | 245 | 70/30 | 18.4-CA | 4.6 | 77 | 337 |
| Example III | 245 | 70/30 | 2.8-CA, 10-BC | 10.7 | 76.5 | 260 |
| Example III | 245 | 70/30 | 3.0-CA, 8-n-BuOH | 11.0 | 78 | 233 |
| Example III | 245 | 70/30 | 12.0-BC | 12.0 | 75.7 | 250 |
| Example II | 175 | 75/25 | 28-CA | — | 72 | 480 |
| Example II | 175 | 75/25 | 24.5-CA | 3.5 | 72 | 430 |
| Example II | 175 | 75/25 | 24.0-BC | 8.0 | 68 | 440 |
| Example I | 160 | 75/25 | 18.7-CA | 6.0 | 75 | 355 |
| Resin 4, Table I | 220 | 73/27 | 20-CA | 6.0 | 75 | 378 |
| Resin 4, Table I | 220 | 73/27 | 19.3-BC | 9.9 | 70.8 | 373 |
| Resin 6, Table I | 260 | 73/27 | 18-CA | 6.0 | 75 | 348 |
| Resin 6, Table I | 260 | 73/27 | 3-CA, 14-BC | 10.0 | 73 | 322 |
| Resin 1, Table I | 320 | 70/30 | 18-CA | 9.0 | 75 | 333 |
| Resin 1, Table I | 320 | 70/30 | 2.7-CA, 7.6-BC | 13.7 | 76 | 228 |
| Example IV | 150 | 75/25 | 30-CA | — | 70 | 524 |
| Example IV | 150 | 75/25 | 31.5-BC | — | 68.5 | 557 |

TABLE III-continued

| | | Polyester/Resimene 747 or Cymel 303/Solvent Systems | | | | |
|---|---|---|---|---|---|---|
| Resin | OH Value | Resin/Cy 303 or Res 747 | % VOC Solvent | % Water | % NV | VOC gms/1000 Film |
| Example IV | 150 | 75/25 | 25.8-BC | 6.7 | 67.5 | 475 |

The hydroxyl value, polyester cross linker ratio, percent water, percent solids, and grams of VOCs for each formulation are all illustrated in Table III, and show a general reduction of VOCs with a water/organic solvent combination.

The amount of water that can be added to the polyester and amino resin cross linking agent is closely related to the hydroxyl content of the polyester or alkyd. Under maximum conditions for water solubility with butyl cellosolve as the sole cosolvent and a low melamine level, the hydroxyl number is approximately equal to the pounds of water that can be added to 1,000 pounds of the polyester portion of the system formulation. Generally, the degree of water acceptance decreases if the amino resin cross linking agent content is increased or if there is much cellosolve acetate in the system. Generally, however, it can be stated that the resin, solvent, and cross linker are selected such that $$(OH\#_R)(X)_R + (OH\#_S)(X_S) + (OH\#_C)(X_C) \geq 105$$

where $OH\#_{R,S,C}$ represent the hydroxyl values of the resin, the solvent and the cross linking agent; $X_{R,S,C}$ represent the proportions by weight of the latter ingredients; and $X_R + X_S + X_C = 1$.

It should be understood that while certain preferred embodiments of the present invention have been illustrated and described, various modifications thereof will become apparent to those skilled in the art. Accordingly, the scope of the present invention should be defined by the appended claims and equivalents thereof.

Various features of the invention are set forth in the following claims.

What is claimed is:

1. A coating composition consisting essentially of
a polyester having a hydroxyl value of at least about 150, said polyester being a reaction product of a dibasic acid or acid anhydride thereof with a polyol selected from the group consisting of propylene glycol, neopentyl glycol, trimethylol propane and mixtures thereof;
a cosolvent comprising water and an organic solvent, said water comprising at least about 2% by weight of said coating composition, said organic solvent having a water solubility in the range from about 5% by weight to complete miscibility in water, and
a cross-linking agent miscible with said polyester and with said cosolvent.

2. A coating composition as recited in claim 1 wherein said polyester has a hydroxyl value in the range of about 150 to about 350 and a number average molecular weight in the range of about 300 to about 1100.

3. A coating composition as recited in claim 1 wherein the polyester has a solids content in the range of from about 85% to about 100% by weight of the polyester.

4. A coating composition as recited in claim 1 wherein said dibasic acid or anhydride thereof is selected from the group consisting of isophthalic acid, adipic acid, phthalic acid, terephthalic acid, anhydrides thereof and mixtures thereof.

5. A coating composition as recited in claim 1 wherein said cross linking agent is an amino resin.

6. A coating composition as recited in claim 5 wherein said cross linking agent is an amino resin selected from the group consisting of methylated melamine, hexamethoxymethyl melamine, methylated urea and mixtures thereof.

7. A coating composition as recited in claim 1 wherein said organic solvent is selected from the group consisting of cellosolve acetate, butyl cellosolve, n-butyl alcohol, isobutanol, n-propoxypropanol and mixtures thereof.

8. A coating composition as recited in claim 1 wherein the water to organic solvent is in ratio in the range of from about 20/80 to about 60/40.

9. A coating composition in accordance with claim 1 in combination with a pigment, the weight ratio of said pigment to said binder ranging up to about 2 to 1.

10. A coating composition consisting essentially of
a pigment;
a polyester having a hydroxyl value of at least about 150, said polyester being a reaction product of a dibasic acid or acid anhydride thereof, with a polyol selected from the group consisting of propylene glycol, neopentyl glycol, trimethylol propane and mixtures thereof;
an organic solvent which has a water solubility in the range from about 5% by weight to complete miscibility in water;
water comprising at least about 2% by weight of the coating composition; and
a cross-linking agent miscible with said polyester, said organic solvent and said water.

11. A coating composition as recited in claim 10 wherein said polyester has a hydroxyl value in the range of about 150 to about 350 and a number average molecular weight in the range of about 300 to about 1100.

12. A coating composition as recited in claim 10 wherein the polyester has a solids content in the range of from about 85% to about 100% by weight of the polyester.

13. A coating composition as recited in claim 10 wherein said dibasic acid or anhydride thereof is selected from the group consisting of isophthalic acid, adipic acid, phthalic acid, terephthalic acid, anhydrides thereof and mixtures thereof.

14. A coating composition as recited in claim 10 wherein said cross linking agent is an amino resin.

15. A coating composition as recited in claim 14 wherein said cross linking agent is an amino resin selected from the group consisting of methylated melamine, hexamethoxymethyl melamine, methylated urea and mixtures thereof.

16. A coating composition as recited in claim 10 wherein said organic solvent is selected from the group consisting of cellusolve acetate, butyl cellosolve, n-butyl alcohol, isobutanol, n-propoxypropanol and mixtures thereof.

17. A coating composition as recited in claim 10 wherein the water to organic solvent is in ratio in the range of from about 20/80 to about 60/40.

18. A coating composition comprising:
a solvent mixture which includes an organic solvent and water;
a nonetherified and nonneutralized polyester having a hydroxyl value of at least 150; said polyester being a reaction product of a dibasic acid or anhydride thereof with a polyol;
a cross linking agent;
said polyester and said cross-linking agent solubilized in said solvent mixture;
said organic solvent having a water solubility in the range from about 5% by weight to complete miscibility in water; and
said water comprising at least 2% by weight of the coating composition.

19. A coating composition as recited in claim 18 wherein said cross linking agent is an amino resin selected from the group consisting of methylated malamine, hexamethoxymethyl melamine, methylated urea and mixtures thereof.

20. A coating composition as recited in claim 19 wherein said organic solvent is selected from the group consisting of cellosolve acetate, butyl cellosolve, n-butyl alcohol, isobutanol, n-propoxypropanol and mixtures thereof.

21. A coating composition as recited in claim 20 wherein the water to organic solvent is in ratio in the range of from about 20/80 to about 60/40.

22. A coating composition comprising:
a solvent mixture which includes an organic solvent and water having solubilized therein a nonneutralized polyester and a cross-linking agent;
said organic solvent having a water solubility in the range from about 5% by weight to complete miscibility;
said water comprising at least 2% by weight of the coating composition; and
said polyester having a hydroxyl value of at least 150 and consisting essentially of a reaction product of a dibasic acid or acid anhydride thereof and a polyol selected from the group consisting of propylene glycol, neopentyl glycol, trimethylol propane and mixtures thereof.

23. A coating composition as recited in claim 22 wherein said polyester has a hydroxyl value in the range of about 150 to about 350 and a number average molecular weight in the range of about 300 to about 1100.

24. A coating composition as recited in claim 23 wherein the polyester has a solids content in the range of from about 85% to about 100% by weight of the polyester.

25. A coating composition as recited in claim 23 wherein said dibasic acid or anhydride thereof is selected from the group consisting of isophthalic acid, adipic acid, phthalic acid, terephthalic acid, anhydrides thereof and mixtures thereof.

26. A coating composition as recited in claim 25 wherein said cross-linking agent is an amino resin selected from the group consisting of methylated melamine, hexamethoxymethyl melamine, methylated urea and mixtures thereof.

27. A coating composition as recited in claim 22 wherein said cross-linking agent is an amino resin.

28. A coating composition as recited in claim 26 wherein said organic solvent is selected from the group consisting of cellosolve acetate, butyl cellosolve, n-butyl alcohol, isobutanol, n-propoxypropanol and mixtures thereof.

29. A coating composition as recited in claim 28 wherein the water to organic solvent is in ratio in the range of from about 20/80 to about 60/40.

30. A method for reducing volatile organic emissions from a polyester coating composition, said method comprising:
providing a solvent mixture of water and an organic solvent, said water comprising at least about 2% by weight of said coating composition and said organic solvent having a water solvency of from about 5% by weight to complete miscibility and solubilizing in said solvent mixture a cross-linking agent and a polyester;
said polyester having a hydroxly number of at least 150 and being a nonneutralized reaction product of a dibasic acid or acid anhydride thereof and a polyol selected from the group consisting of propylene glycol, neopentyl glycol, trimethylol propane and mixtures thereof.

31. A method as recited in claim 30 wherein said cross-linking agent is an amino resin.

32. A method as recited in claim 31 wherein the polyester has a solids content in the range of from about 85% to about 100% by weight of the polyester.

33. A method as recited in claim 31 wherein said organic solvent is selected from the group consisting of cellosolve acetate, butyl cellosolve, n-butyl alcohol, isobutanol, n-propoxypropanel and mixtures thereof.

34. A method as recited in claim 33 wherein said amino resin cross-linking agent is selected from the group consisting of methylated melamine, hexamethyoxymethyl melamine, methylated urea, and mixtures thereof.

35. A method as recited in claim 34 wherein the water to organic solvent is in a ratio in the range of from about 20/80 to about 60/40.

* * * * *

UNITED STATES PATENT AND TRADEMARK OFFICE
CERTIFICATE OF CORRECTION

PATENT NO. : 4,616,054

DATED : October 7, 1986

INVENTOR(S) : Morris R. Olson

PAGE 1 of 2

It is certified that error appears in the above-identified patent and that said Letters Patent is hereby corrected as shown below:

Publications, line 3, other prior art, after "Acrylate", insert a close quotation mark.

Column 2, line 1, second occurrence, change "an" to --a--.

line 31, after "water," delete --water,--.

Column 3, line 1, change "Resimeme" to --Resimene--.

312 Amendment, column 3, line 32, change "organge" to

--orange--.

Claim 6, column 6, lines 12-13, change "malamine" to

--melamine--.

312 Amendment, column 8, lines 58-59, change "malamine" to

--melamine--.

312 Amendment, column 8, line 63, change "cellusolve" to

--cellosolve--.

UNITED STATES PATENT AND TRADEMARK OFFICE
CERTIFICATE OF CORRECTION

PATENT NO. : 4,616,054
DATED : October 7, 1986
INVENTOR(S) : Morris R. Olson

PAGE 2 of 2

It is certified that error appears in the above-identified patent and that said Letters Patent is hereby corrected as shown below:

Amendment A, column 9, line 5, change "semi-colon" to

--comma--.

312 Amendment, column 9, lines 18-19, change "malamine" to

--melamine--.

Amendment A, column 10, line 30, change "hydroxly" to

--hydroxyl--.

312 Amendment, column 10, line 44, change "n-propoxypropanel"

to --n-propoxypropanol--.

Amendment A, column 10, lines 47-48, change "hexamethyoxymethyl"

to --hexamethoxymethyl--.

Signed and Sealed this

Thirtieth Day of December, 1986

*Attest:*

DONALD J. QUIGG

*Attesting Officer*   *Commissioner of Patents and Trademarks*